US011356162B2

(12) United States Patent
Tsai

(10) Patent No.: US 11,356,162 B2
(45) Date of Patent: Jun. 7, 2022

(54) CSI REPORTING FOR MULTIPLE TRANSMISSION POINTS

(71) Applicant: Mediatek Inc., Hsinchu (TW)

(72) Inventor: Lung-Sheng Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 100 days.

(21) Appl. No.: 16/880,181

(22) Filed: May 21, 2020

(65) Prior Publication Data
US 2020/0373985 A1 Nov. 26, 2020

Related U.S. Application Data

(60) Provisional application No. 62/852,368, filed on May 24, 2019.

(51) Int. Cl.
H04B 7/06 (2006.01)
H04W 72/04 (2009.01)
H04L 5/00 (2006.01)
H04W 24/10 (2009.01)

(52) U.S. Cl.
CPC ......... H04B 7/0626 (2013.01); H04L 5/0051 (2013.01); H04W 24/10 (2013.01); H04W 72/0413 (2013.01)

(58) Field of Classification Search
CPC .............. H04W 72/0413; H04W 24/10; H04L 5/0051; H04B 7/0626
See application file for complete search history.

(56) References Cited

U.S. PATENT DOCUMENTS

| 10,602,389 | B2* | 3/2020 | Lee ........................ H04W 24/10 |
| 10,931,354 | B2* | 2/2021 | Tsai ....................... H04B 7/0626 |
| 2013/0148611 | A1 | 6/2013 | Moulsley et al. |
| 2016/0112892 | A1 | 4/2016 | Damnjanovic et al. |
| 2016/0338041 | A1 | 11/2016 | Li et al. |
| 2017/0070331 | A1 | 3/2017 | Hoshino et al. |
| 2019/0053084 | A1 | 2/2019 | Hosseini et al. |
| 2019/0053089 | A1 | 2/2019 | Kwak et al. |

(Continued)

FOREIGN PATENT DOCUMENTS

| CN | 102291223 A | 12/2011 |
| CN | 104620627 A | 5/2015 |

(Continued)

OTHER PUBLICATIONS

Taiwan Patent Office, "Office Action", dated Jan. 29, 2021. Taiwan.
(Continued)

Primary Examiner — Deepa Belur
(74) Attorney, Agent, or Firm — Locke Lord LLP; Tim Tingkang Xia, Esq.

(57) ABSTRACT

In an aspect of the disclosure, a method, a computer-readable medium, and an apparatus are provided. The apparatus may be a UE. The UE determines to report CSI reports. The UE determines that a first CSI report and a second CSI report to be reported contain same CSI information. The UE determines that total processing units required for updating the first CSI report and the second CSI report to be processing units required for updating one of the first CSI report and the second CSI report. The UE updates the first CSI report and the second CSI report based on a same CSI calculation.

18 Claims, 10 Drawing Sheets

(56) References Cited

U.S. PATENT DOCUMENTS

| | | | |
|---|---|---|---|
| 2019/0124539 A1 | 4/2019 | Kim et al. | |
| 2019/0149285 A1* | 5/2019 | Tsai | H04L 1/0026 370/329 |
| 2019/0149305 A1* | 5/2019 | Zhou | H04L 1/0026 370/330 |
| 2021/0127387 A1* | 4/2021 | Huang | H04L 5/0091 |

FOREIGN PATENT DOCUMENTS

| | | | | |
|---|---|---|---|---|
| CN | 105122680 A | 12/2015 | | |
| CN | 107431515 A | 12/2017 | | |
| EP | 3832933 A1 * | 6/2021 | ........... | H04B 7/0626 |
| WO | 2017078826 A1 | 5/2017 | | |
| WO | WO-2021128885 A1 * | 7/2021 | | |

OTHER PUBLICATIONS

PCT International Search Report, PCT/CN2020/091792, dated Jul. 30, 2020.
3GPP TSG RAN WG1 Meeting #92bis, R1-1804973, Sanya, China, Apr. 16-20, 2018.
3GPP TSG RAN WG1 Meeting #94bis, R1-1811982, Chengdu, China, Oct. 8-12, 2018.
PCT International Search Report, PCT/CN2020/088419, dated Aug. 11, 2020.
3GPP TSG RAN WG1 Meeting #70, R1-123365, Qingdao, China, Aug. 13-17, 2012.
3GPP TSG-RAN WG1 Meeting #70, R1-123578, Qingdao, China, Aug. 13-17, 2012.

* cited by examiner

CSI REPORTING FOR MULTIPLE TRANSMISSION POINTS

CROSS-REFERENCE TO RELATED APPLICATION(S)

This application claims the benefits of U.S. Provisional Application Ser. No. 62/852,368, entitled "CSI REPORTING FOR MULTIPLE TRANSMISSION POINTS" and filed on May 24, 2019, which is expressly incorporated by reference herein in its entirety.

BACKGROUND

Field

The present disclosure relates generally to communication systems, and more particularly, to techniques of simultaneously reporting multiple channel state information (CSI) reports by a user equipment (UE) to multiple transmission and reception points (TRPs).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. In an aspect of the disclosure, a method, a computer-readable medium, and an apparatus are provided. The apparatus may be a UE. The UE determines to report CSI reports. The UE determines that a first CSI report and a second CSI report to be reported contain same CSI information. The UE determines that total processing units required for updating the first CSI report and the second CSI report to be processing units required for updating one of the first CSI report and the second CSI report. The UE updates the first CSI report and the second CSI report based on a same CSI calculation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
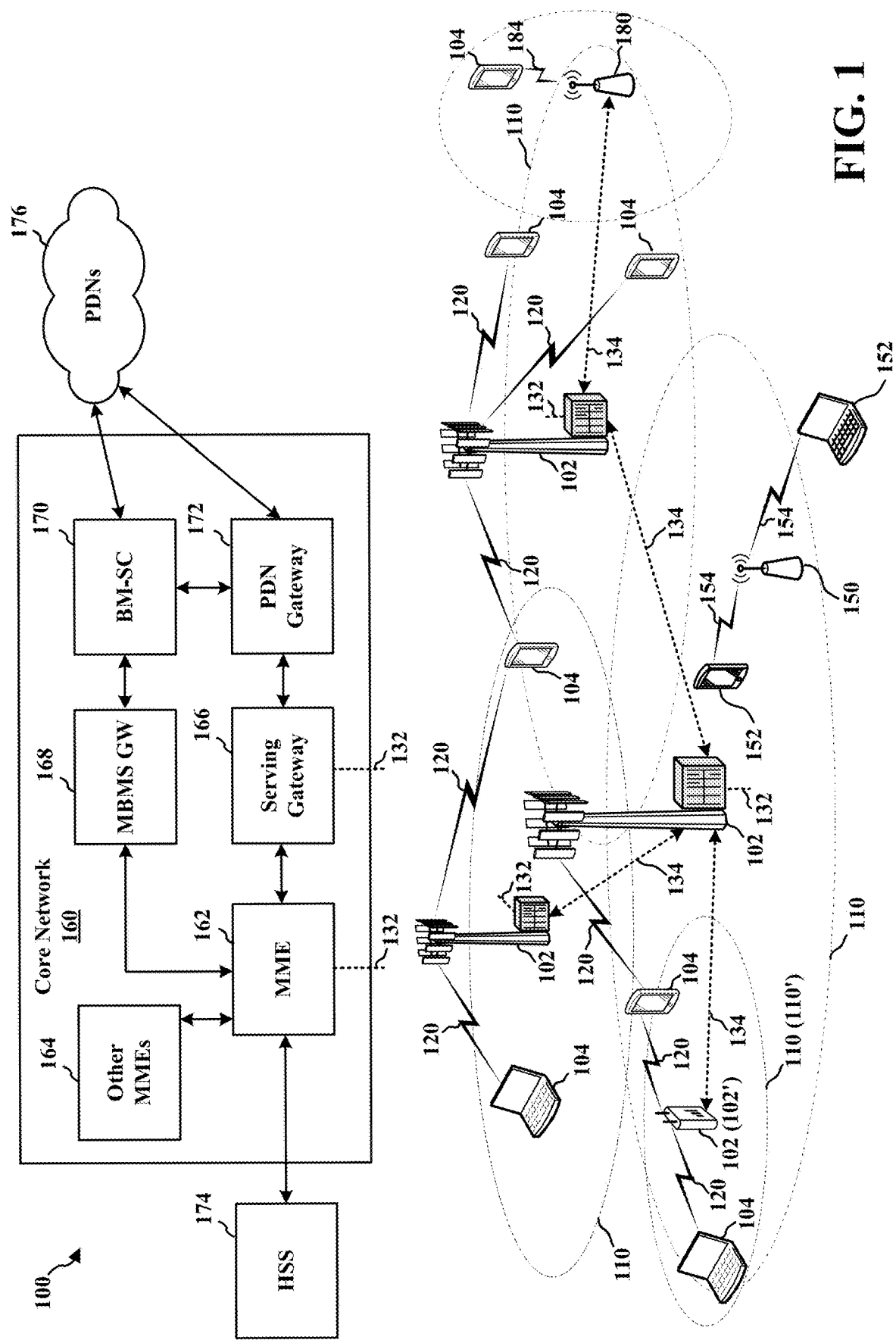
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
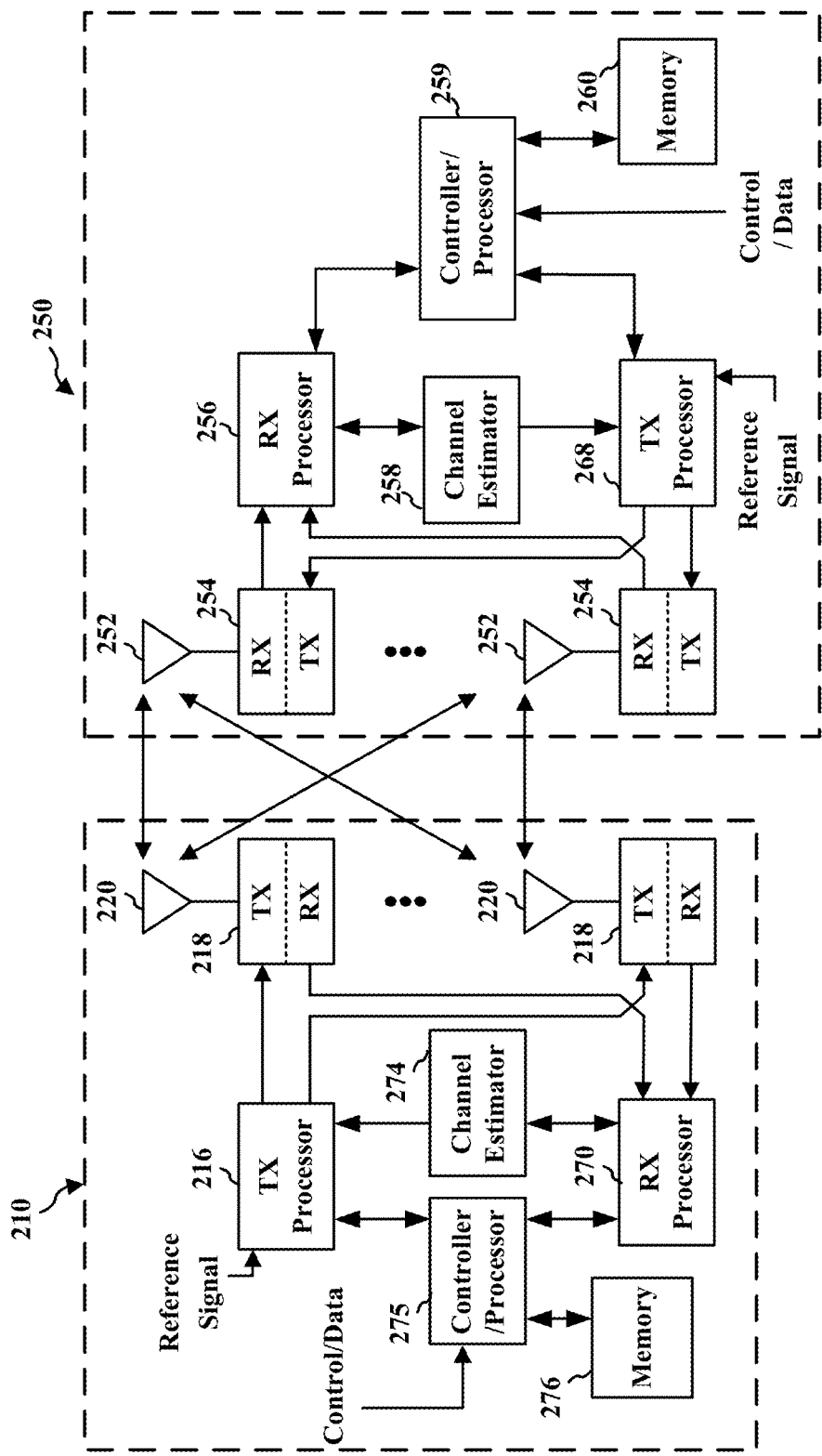
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
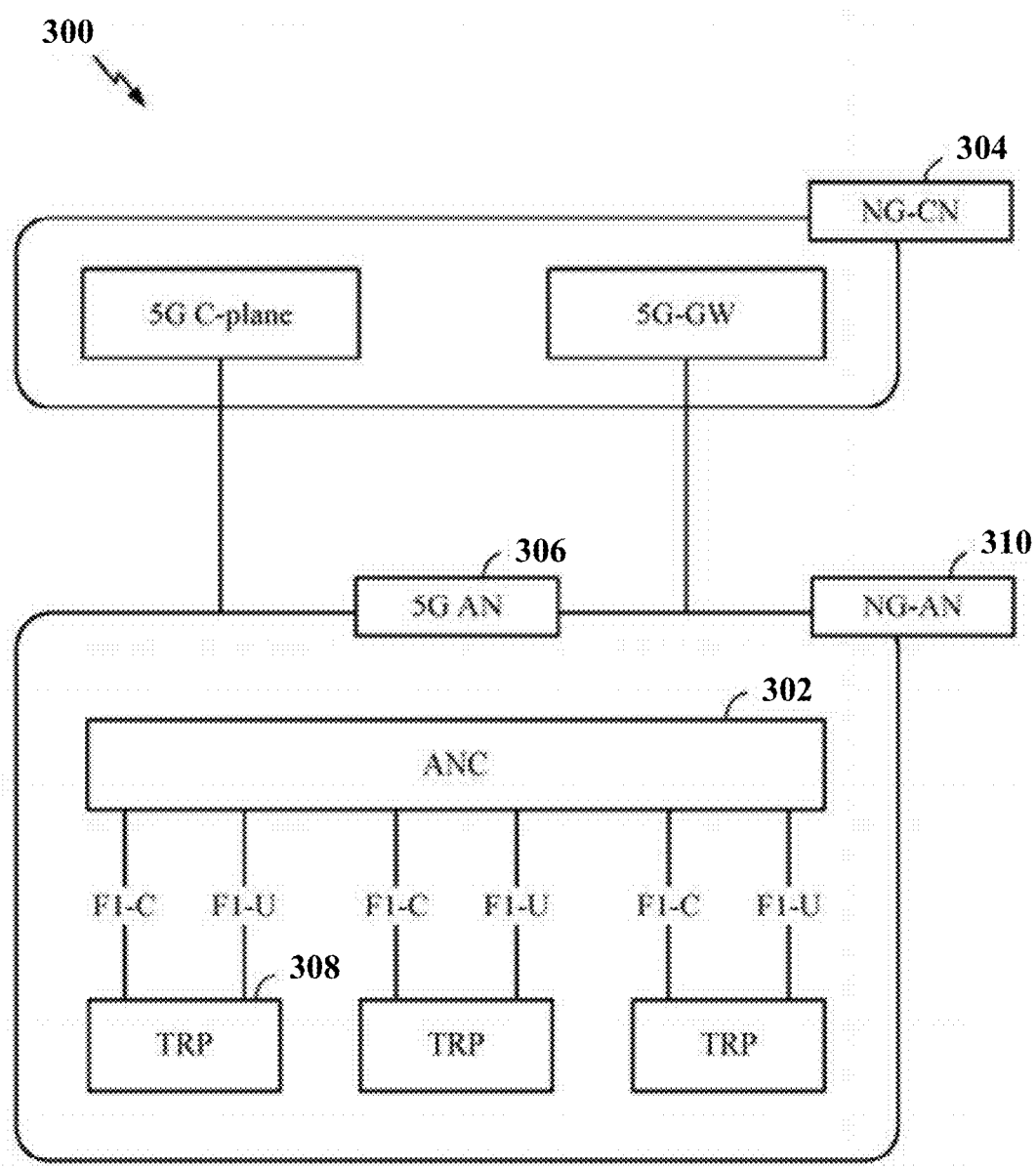
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
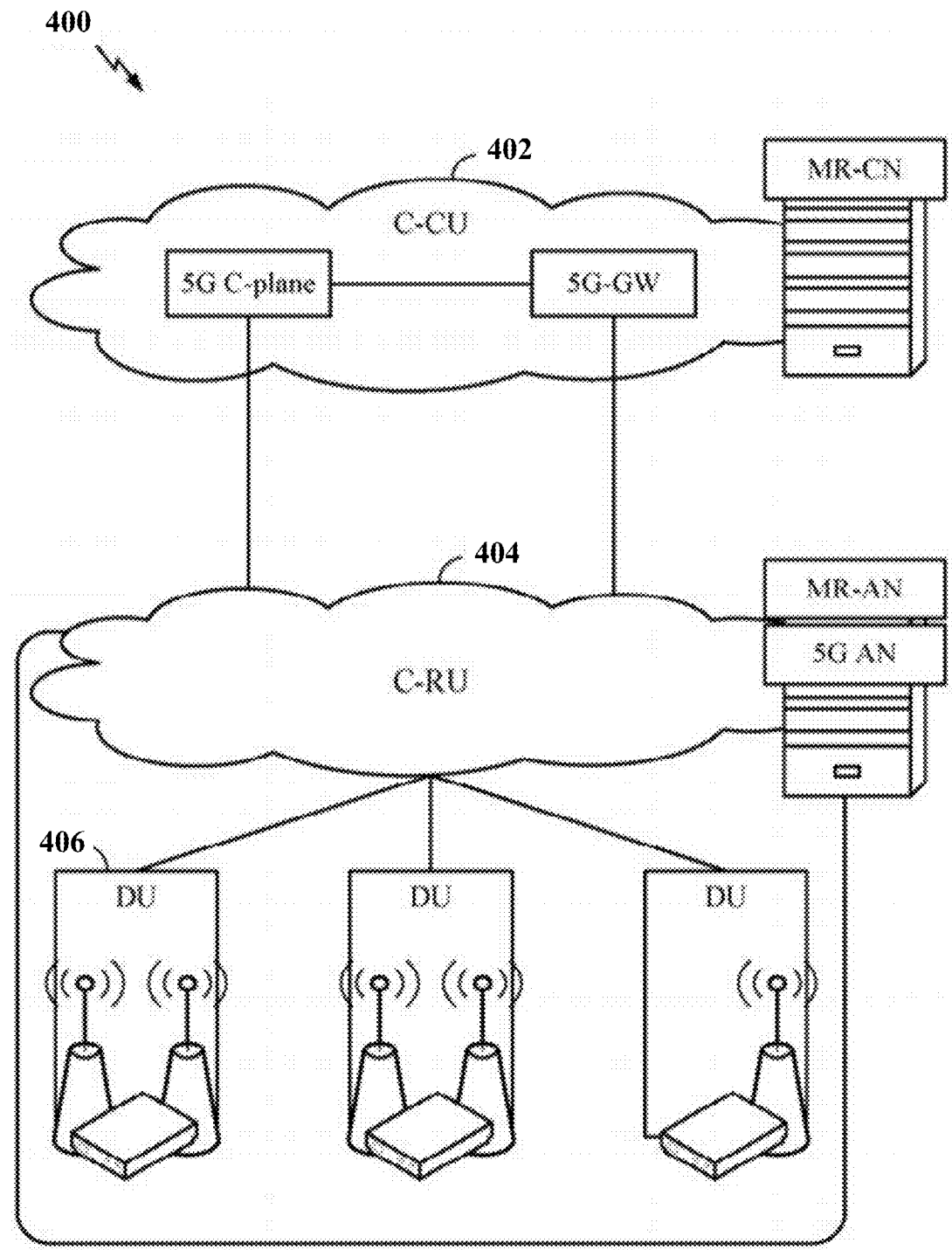
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
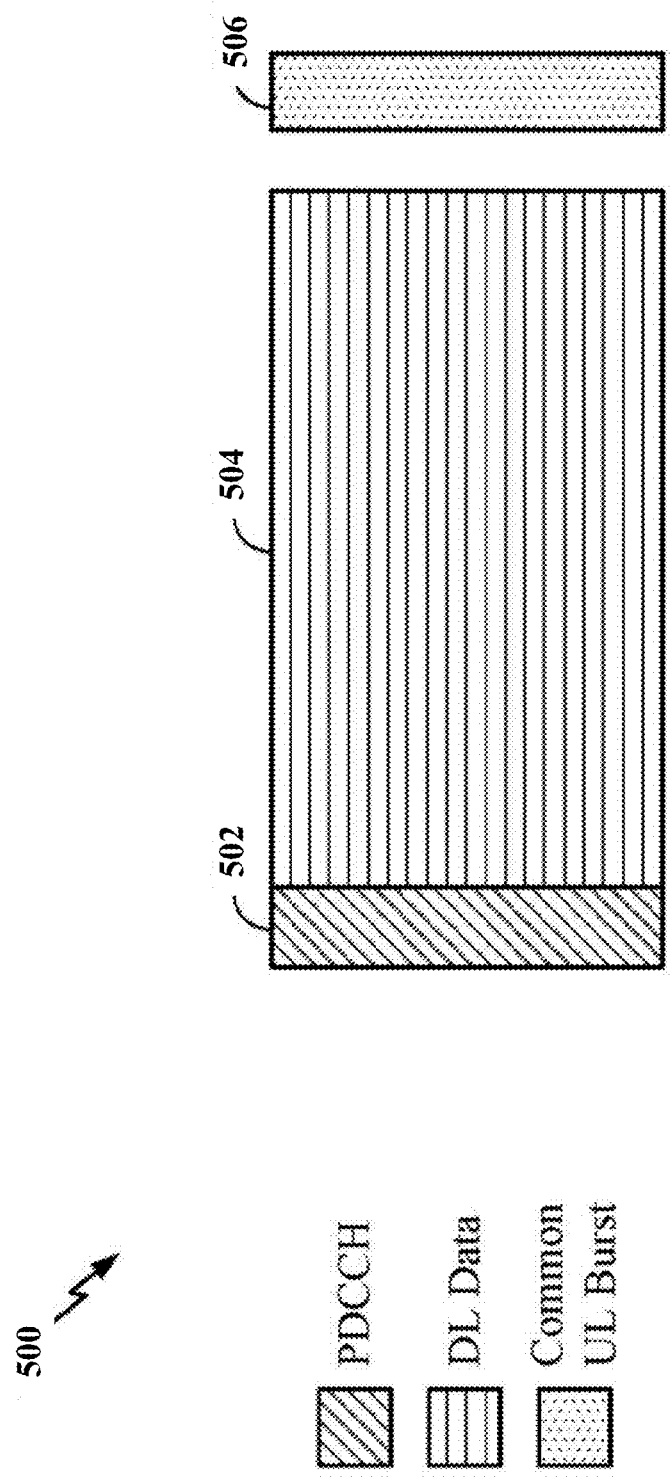
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
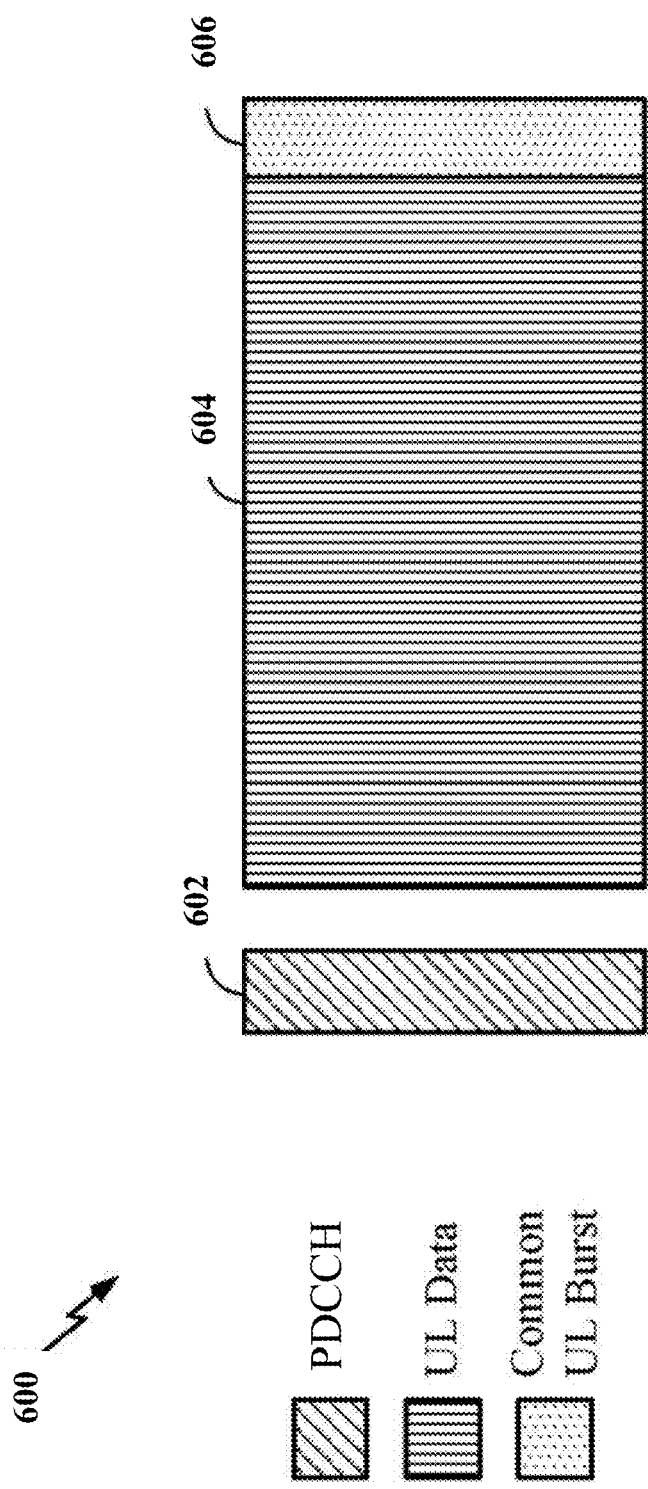
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Channel state information (CSI) reports provide the network with information about the current channel conditions. CSI usually comprises one or more pieces of information: rank indicator (RI), precoder matrix indicator (PMI), channel-quality indicator (CQI), Reference Signal Received Power (RSRP), and channel state information reference signal (CSI-RS) resource indicator (CRI).

In the present disclosure, one or more terms or features are defined or described in "3GPP TS 38.214 V15.5.0 (March 2019) Technical Specification; 3rd Generation Partnership Project; Technical Specification Group Radio Access Network; NR; Physical layer procedures for data (Release 15)" (3GPP TS 38.214); or in "3GPP TS 38.331 V15.5.1 (April 2019); Technical Specification; 3rd Generation Partnership Project; Technical Specification Group Radio Access Network; NR; Radio Resource Control (RRC) protocol specification; (Release 15)" (3GPP TS 38.331); all of which are expressly incorporated by reference herein in their entirety. Those terms and features are known by a person having ordinary skill in the art.

In certain circumstances, if only non-Coordinated Multi-point (CoMP) CSI is reported, independent scheduling for M-DCI based multiple PDSCHs cannot bring system gain and may degrade system performance. Rank-restriction may be needed to eliminate the performance loss but still cannot lead performance gain as that observed in scenarios with ideal backhaul non-coherent joint transmission (NCJT).

Figure 7:
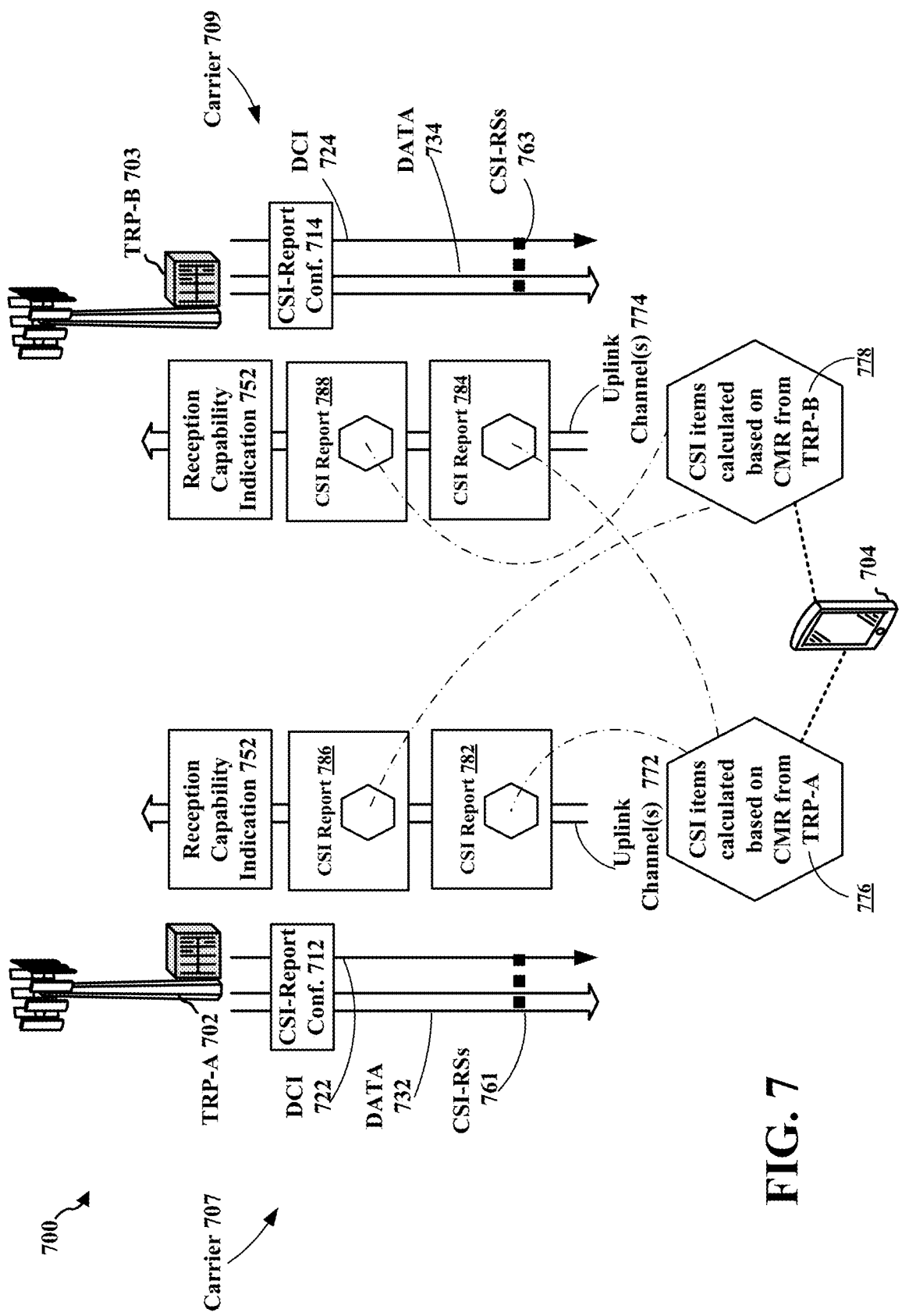
FIG. 7 is a diagram illustrating calculation of CSI reports by a UE.

FIG. 7 is a diagram 700 illustrating calculation of CSI reports by a UE 704. The UE 704 is configured to communicate signaling and data with multiple transmission and reception points (TRPs), concurrently. In particular, the UE 704 can receive respective PDCCHs from the multiple TRPs, concurrently. In this example, only a TRP-A 702 and a TRP-B 703 are shown in FIG. 7, and the other TRPs are not shown.

In this example, the TRP-A 702 and the TRP-B 703 do not operate in accordance with Coordinated Multi-point (CoMP). The UE 704 supports multiple-PDCCH based multiple-TRP/panel transmission. The TRP-A 702 may transmit, on a carrier 707, DCI 722 (e.g., in a PDCCH) and data 732 (e.g., in a PDSCH), and the TRP-B 703 may transmit, on a carrier 709, DCI 724 (e.g., in a PDCCH) and data 734 (e.g., in a PDSCH), simultaneously to the UE 704. In addition, the TRP-A 702 transmits CSI-RSs 761 on the carrier 707, and the TRP-B 703 transmits CSI-RSs 763 of the carrier 709. CSI-RS stands for channel state information (CSI) reference signal. The UE 704 and the TRP-A 702 also established uplink channel(s) 772 on the carrier 707; the UE 704 and the TRP-B 703 also established uplink channel(s) 774 on the carrier 709.

The carrier 707 and the carrier 709 may overlap in time and frequency domains. The TRP-A 702 and the TRP-B 703 may communicate control and data signals with the UE 704 on the same resource grid. The TRP-A 702 and the TRP-B 703 each may be located at a different base station.

The UE 704 may need to update CSI reports to the TRP-A 702, the TRP-B 703, and the other TRPs. The techniques described infra use the TRP-A 702 and the TRP-B 703 as an example, and can be similarly applied to the other TRPs.

The UE 704 has a limited amount of computing power for calculation of CSI reports. A processing unit may be used to indicate a predetermined amount of computing power of the UE 704. For example, based on the hardware configuration of the UE 704, the UE 704 may be set up with total T processing units for calculation of CSI reports. In certain configurations, the UE 704 may send a reception capability indication 752 to the TRP-A 702 and/or the TRP-B 703 indicating that the UE 704 possesses total T processing units available for calculation of CSI reports.

The TRP-A 702 and the TRP-B 703 may send CSI-Report configuration 712, CSI-Report configuration 714 to the UE 704, respectively, based on which the UE 704 updates CSI reports and transmits the CSI reports to the TRP-A 702 and the TRP-B 703. Typically, a CSI-Report configuration indicates at least one of 1) measurement resource(s), 2) report quantity (e.g., RI/PMI/CQI report or L1-RSRP report), and 3) resource used to feedback the report (e.g., a particular PUCCH resource).

The TRP-A 702 may request dynamic point selection (DPS) CSI with desired signal from the TRP-A 702 and interference from the TRP-B 703. In particular, the TRP-A 702 may be interested in acquiring CSI of the channel between the TRP-A 702 and the UE 704 (e.g., the carrier 707) as well as the CSI of the channel between the TRP-B 703 and the UE 704 (e.g., the carrier 709). The CSI-Report configuration 712 from the TRP-A 702 may instruct the UE 704 to measure the CSI-RSs 761 as channel measurement resource (CMR), while treating any overlapping signals from the TRP-B 703 carrying the DCI 724, the data 734, the CSI-RSs 763 as interference, and calculating CSI items 776 such as Channel Quality Indicator (CQI), Precoding Matrix Index (PMI), Rank Indicator (RI), etc. Similarly, the CSI-Report configuration 712 may also instruct the UE 704 to measure the CSI-RSs 763 as CMR, while treating any overlapping signals from the TRP-A 702 carrying the DCI 722, the data 732, the CSI-RSs 761 as interference, and calculating similar CSI items 778.

The TRP-A 702 may send a trigger to the UE 704 requesting the UE 704 to send a CSI report 782 containing the CSI items 776 calculated based on channel measurement resource from the TRP-A 702. The TRP-A 702 may also send another trigger to the UE 704 requesting the UE 704 to send a CSI report 786 containing the CSI items 778 calculated based on channel measurement resource from the TRP-B 703.

Similarly, the TRP-B 703 may request dynamic point selection (DPS) CSI with desired signal from the TRP-B 703 and interference from the TRP-A 702. In particular, the TRP-B 703 may be interested in acquiring CSI of the channel between the TRP-B 703 and the UE 704 (e.g., the carrier 709) as well as the CSI of the channel between the TRP-A 702 and the UE 704 (e.g., the carrier 707). The CSI-Report configuration 714 from the TRP-B 703 may instruct the UE 704 to measure the CSI-RSs 763 as CMR, while treating any overlapping signals from the TRP-A 702 carrying the DCI 722, the data 732, the CSI-RSs 761 as interference, and calculating the CSI items 778. Similarly, the CSI-Report configuration 714 may also instruct the UE 704 to measure the CSI-RSs 761 as CMR, while treating any overlapping signals from the TRP-B 703 carrying the DCI 724, the data 734, the CSI-RSs 763 as interference, and calculating the CSI items 776.

As such, proprietary rules may be applied so that one TRP can partially predict the scheduling decision at another TRP. For example, for the UE 704 that may at most support total rank no greater than 2, if a report with RI=2 and CQI=15 is corresponding to that a desired signal is sent from the TRP-A 702 while another report with RI=1 and CQI=1 is corresponding to that a desired signal is sent from for the TRP-B 703, the TRP-A 702 may assume that the TRP-B 703 is unlikely to schedule PDSCH for the UE 704. Then the TRP-A 702 can schedule the UE 704 using rank-2 without setting rank-restriction to avoid total rank greater than 2.

As described supra, the UE 704 may determine whether to update a given CSI report based on the available processing units and the processing units required to calculate the give CSI report. In a first configuration, the UE 704 allocates processing units to each of the triggered CSI reports. For example, upon receiving a trigger from the TRP-A 702 for updating the CSI report 782 and a trigger from the TRP-B 703 for updating the CSI report 784, the UE 704 allocates the processing units (e.g., X processing units) required to calculate the CSI items 776 to each of the CSI report 782 and the CSI report 784, as both of the CSI report 782 and the CSI report 784 contain the same CSI items 776 calculated based on channel measurement resource from the TRP-A 702. As such, in certain circumstances, although the UE 704 may only consume X processing units to calculate the CSI items 776 once and include the CSI items 776 in both the CSI report 782 and the CSI report 784, the UE 704 reduces 2X processing units from the available processing unit count. Although the UE 704 may only consume Y processing units to calculate the CSI items 778 once and include the CSI items 778 in both the CSI report 786 and the CSI report 788, the UE 704 reduces 2Y processing units from the available processing unit count.

In this example, the UE 704 determines currently available processing units are greater than (2X+2Y) processing units. The UE 704 then commits to update the CSI report 782, CSI report 786, CSI report 784, and CSI report 788. The UE 704 calculates the CSI items 776 based on the CSI-RSs 761 as well as the CSI items 778 based on the CSI-RSs 763. The UE 704 updates the CSI report 782, CSI report 786, CSI report 784, and CSI report 788. Subsequently, the UE 704 transmits the CSI report 782 and the CSI report 786 to the TRP-A 702 on the uplink channel(s) 772; the UE 704 transmits the CSI report 784 and the CSI report 788 to the TRP-B 703 on the uplink channel(s) 774.

In a second configuration, prior to determining whether the currently available processing units are sufficient for updating the triggered CSI reports, the UE 704 initially determines whether any two or more of the CSI reports contains identical CSI items (or uplink control information (UCI)). The UE 704 allocates the processing units required for updating only one of the two or more CSI reports as the processing units required for updating all of the two or more CSI reports.

In one example, for two periodic/semi-persistent CSI reports configured by two CSI-ReportConfig may be considered as having identical UCI/CSI items when all components (measurement resource, measurement timing, etc.), except for the pucch-CSI-ResourceList element, in two CSI-ReportConfig with different reportConfigId are the same. Those elements are defined in 3GPP TS 38.214 and/or 3GPP TS 38.331. Further, report timing for the two reports may be different.

In this example, the UE 704 determines that the CSI report 782 and the CSI report 784 contain the same CSI items 776 calculated based on channel measurement resource from the TRP-A 702. Accordingly, only X processing units (instead of 2X processing units as in the first configuration) are allocated for updating both of the CSI report 782 and the CSI report 784. The UE 704 also determines that the CSI report 786 and the CSI report 788 contain the same CSI items 778 calculated based on channel measurement resource from the TRP-B 703. Accordingly, only Y processing units (instead of the 2Y processing units as in the first configuration) are required to update both of the CSI report 786 and the CSI report 788.

The UE 704 determines currently available processing units are greater than (X+Y) processing units. The UE 704 then commits to update the CSI report 782, CSI report 786, CSI report 784, and CSI report 788. The UE 704 calculates the CSI items 776 based on the CSI-RSs 761 as well as the CSI items 778 based on the CSI-RSs 763. The UE 704 updates the CSI report 782, CSI report 786, CSI report 784, and CSI report 788. Subsequently, the UE 704 transmits the CSI report 782 and the CSI report 786 to the TRP-A 702 on the uplink channel(s) 772; the UE 704 transmits the CSI report 784 and the CSI report 788 to the TRP-B 703 on the uplink channel(s) 774.

As described supra, processing unit cost may be counted only once if two CSI reports contain identical UCI (or CSI items), as the measurement resource is the same for the two CSI reports and the report quantity is the same in two the reports.

Figure 8:
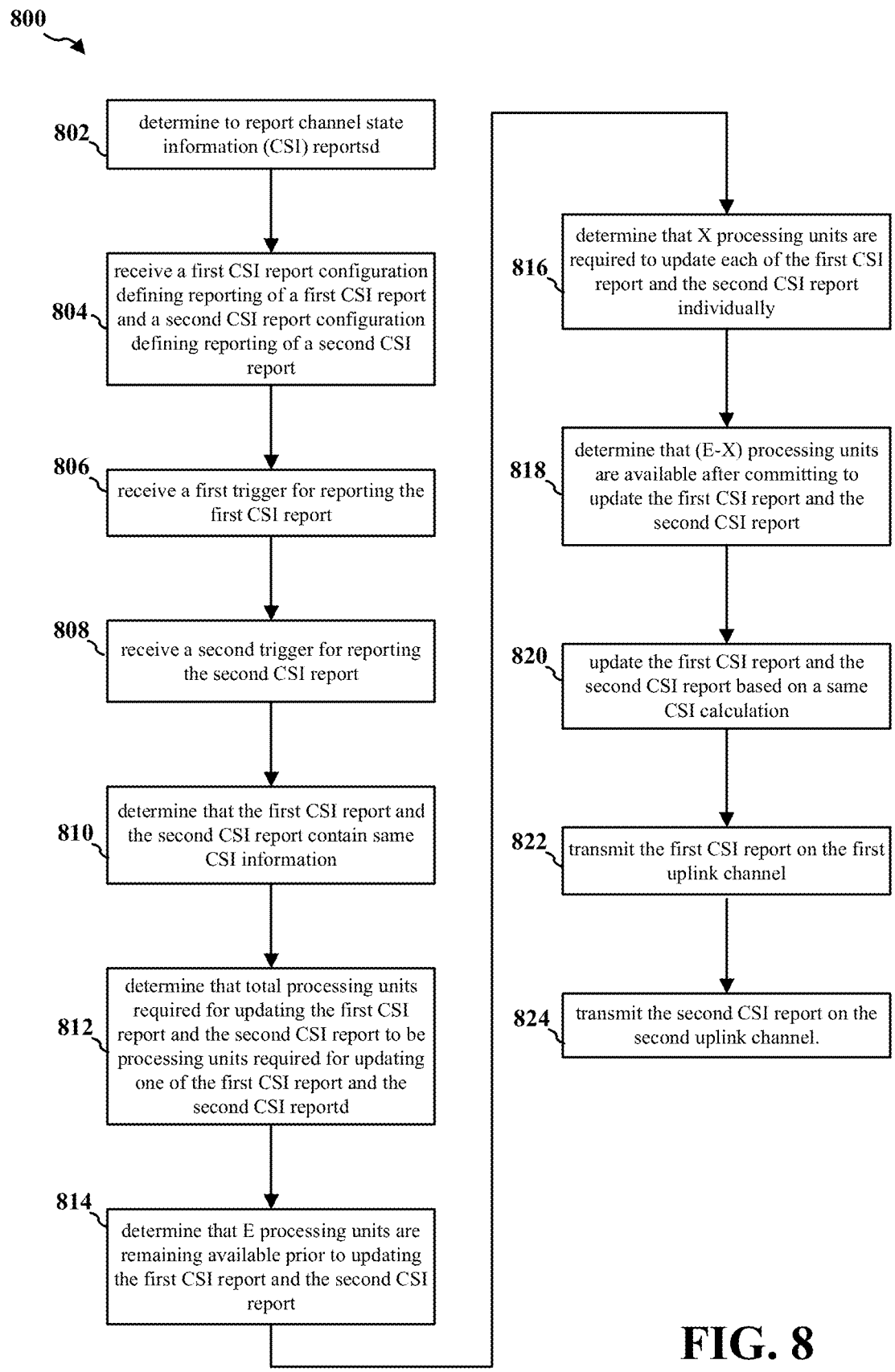
FIG. 8 is a flow chart of a method (process) for updating multiple CSI reports.

FIG. 8 is a flow chart 800 of a method (process) for updating multiple CSI reports. The method may be performed by a UE (e.g., the UE 704, the apparatus 902, and the apparatus 902'). At operation 802, the UE determines to report channel state information (CSI) reports. At operation 804, the UE receives a first CSI report configuration defining reporting of a first CSI report and a second CSI report configuration defining reporting of a second CSI report.

At operation 806, the UE receives a first trigger for reporting the first CSI report. At operation 808, the UE receives a second trigger for reporting the second CSI report. At operation 810, the UE determines that the first CSI report and the second CSI report contain same CSI information based on the first CSI report configuration and the second CSI report configuration. At operation 812, the UE determines that total processing units required for updating the first CSI report and the second CSI report to be processing units required for updating one of the first CSI report and the second CSI report.

At operation 814, the UE determines that E processing units are remaining available prior to updating the first CSI report and the second CSI report, E being an integer. At operation 816, the UE determines that X processing units are required to update each of the first CSI report and the second CSI report individually, X being an integer. At operation 818, the UE determines that (E−X) processing units are available after committing to update the first CSI report and the second CSI report.

At operation 820, the UE updates the first CSI report and the second CSI report based on a same CSI calculation.

At operation 822, the UE transmits the first CSI report on the first uplink channel. At operation 824, the UE transmits the second CSI report on the second uplink channel.

In certain configurations, the first CSI report configuration and the second CSI report configuration are associated with a same reference signal for CSI measurement and a same report quantity. In certain configurations, the first CSI report configuration and the second CSI report configuration both specify a first reference signal as a measurement resource. In certain configurations, the first CSI report configuration specifies that the first CSI report is to be transmitted to a first TRP. The second CSI report configuration specifies that the second CSI report is to be transmitted to a second TRP. In certain configurations, the first CSI report configuration specifies that the first CSI report is to be transmitted on a first uplink channel. The second CSI report configuration specifies that the second CSI report is to be transmitted on a second uplink channel. In some embodiments, the uplink channel can be a physical uplink control channel (PUCCH) or a physical uplink share channel (PUSCH).

Figure 9:
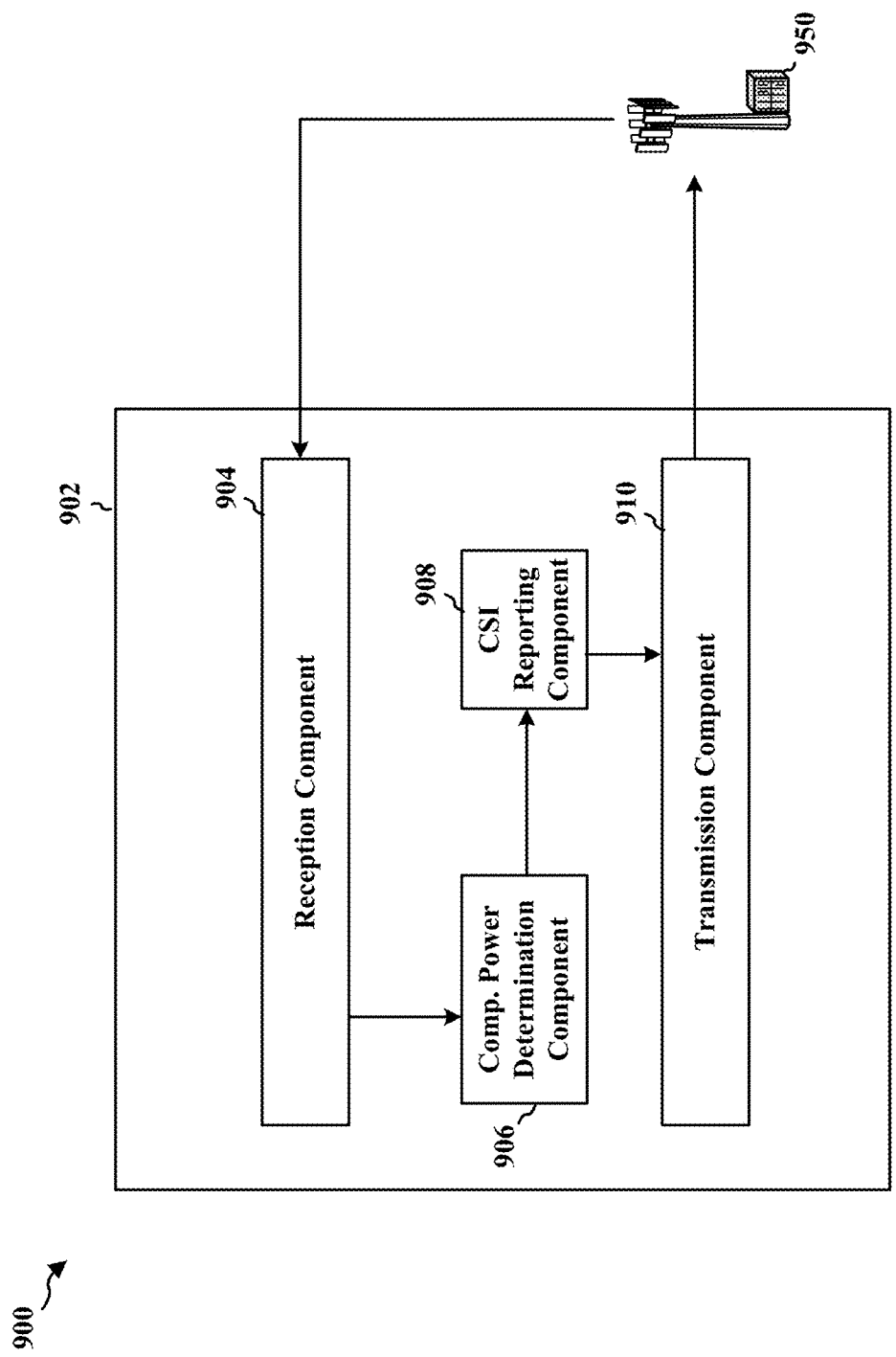
FIG. 9 is a conceptual data flow diagram illustrating the data flow between different components/means in an exemplary apparatus.

FIG. 9 is a conceptual data flow diagram 900 illustrating the data flow between different components/means in an exemplary apparatus 902. The apparatus 902 may be a UE. The apparatus 902 includes a reception component 904, a computing-power-determination component 906, a CSI reporting component 908, and a transmission component 910.

The computing-power-determination component 906 determines to report channel state information (CSI) reports. The CSI reporting component 908 receives a first CSI report configuration defining reporting of a first CSI report and a second CSI report configuration defining reporting of a second CSI report.

The CSI reporting component 908 receives a first trigger for reporting the first CSI report. The CSI reporting component 908 receives a second trigger for reporting the second CSI report. The computing-power-determination component 906 determines that the first CSI report and the second CSI report contain same CSI information based on the first CSI report configuration and the second CSI report configuration. The computing-power-determination component 906 determines that total processing units required for updating the first CSI report and the second CSI report to be processing units required for updating one of the first CSI report and the second CSI report.

The computing-power-determination component 906 determines that E processing units are remaining available prior to updating the first CSI report and the second CSI report, E being an integer. The computing-power-determination component 906 determines that X processing units are required to update each of the first CSI report and the second CSI report individually, X being an integer. The computing-power-determination component 906 determines that (E−X) processing units are available after committing to update the first CSI report and the second CSI report.

The CSI reporting component 908 updates the first CSI report and the second CSI report based on a same CSI calculation. The CSI reporting component 908 transmits the first CSI report on the first uplink channel. The CSI reporting component 908 transmits the second CSI report on the second uplink channel.

In certain configurations, the first CSI report configuration and the second CSI report configuration are associated with a same reference signal for CSI measurement and a same report quantity. In certain configurations, the first CSI report configuration and the second CSI report configuration both specify a first reference signal as a measurement resource. In certain configurations, the first CSI report configuration specifies that the first CSI report is to be transmitted to a first TRP. The second CSI report configuration specifies that the second CSI report is to be transmitted to a second TRP. In certain configurations, the first CSI report configuration specifies that the first CSI report is to be transmitted on a first uplink channel. The second CSI report configuration specifies that the second CSI report is to be transmitted on a second uplink channel. In some embodiments, the uplink channel can be a physical uplink control channel (PUCCH) or a physical uplink share channel (PUSCH).

Figure 10:
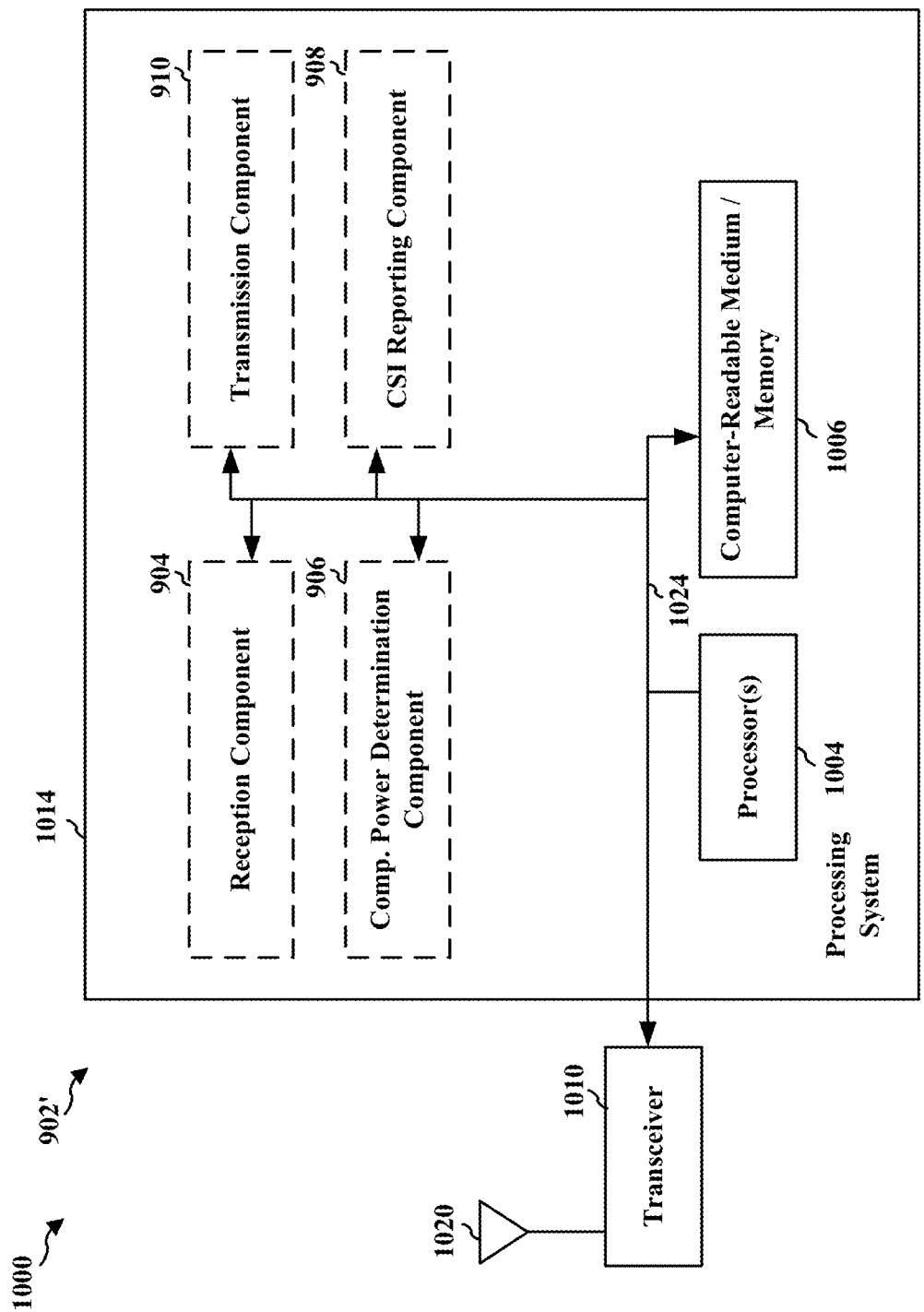
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The apparatus 902' may be a UE. The processing system 1014 may be implemented with a bus architecture, represented generally by a bus 1024. The bus 1024 may include any number of interconnecting buses and bridges depending on the specific application of the processing system 1014 and the overall design constraints. The bus 1024 links together various circuits including one or more processors and/or hardware components, represented by one or more processors 1004, the reception component 904, the computing-power-determination component 906, the CSI reporting component 908, the transmission component 910, and a computer-readable medium/memory 1006. The bus 1024 may also link various other circuits such as timing sources, peripherals, voltage regulators, and power management circuits, etc.

The processing system 1014 may be coupled to a transceiver 1010, which may be one or more of the transceivers 254. The transceiver 1010 is coupled to one or more antennas 1020, which may be the communication antennas 252.

The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020.

The processing system 1014 includes one or more processors 1004 coupled to a computer-readable medium/memory 1006. The one or more processors 1004 are responsible for general processing, including the execution of software stored on the computer-readable medium/memory 1006. The software, when executed by the one or more processors 1004, causes the processing system 1014 to perform the various functions described supra for any particular apparatus. The computer-readable medium/memory 1006 may also be used for storing data that is manipulated by the one or more processors 1004 when executing software. The processing system 1014 further includes at least one of the reception component 904, the computing-power-determination component 906, the CSI reporting component 908, and the transmission component 910. The components may be software components running in the one or more processors 1004, resident/stored in the computer readable medium/memory 1006, one or more hardware components coupled to the one or more processors 1004, or some combination thereof. The processing system 1014 may be a component of the UE 250 and may include the memory 260 and/or at least one of the TX processor 268, the RX processor 256, and the communication processor 259.

In one configuration, the apparatus 902/apparatus 902' for wireless communication includes means for performing each of the operations of FIG. 8. The aforementioned means may be one or more of the aforementioned components of the apparatus 902 and/or the processing system 1014 of the apparatus 902' configured to perform the functions recited by the aforementioned means.

As described supra, the processing system 1014 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining to report channel state information (CSI) reports;
   determining that a first CSI report and a second CSI report to be reported contain same CSI information;
   determining that total processing units required for updating the first CSI report and the second CSI report are processing units required for updating one of the first CSI report and the second CSI report;
   receiving a first trigger for reporting the first CSI report;
   receiving a second trigger for reporting the second CSI report;
   determining that E processing units are remaining available prior to updating the first CSI report and the second CSI report, E being an integer;
   determining that X processing units are required to update each of the first CSI report and the second CSI report individually, X being an integer;
   determining that R processing units are available after committing to update the first CSI report and the second CSI report, R being equal to E minus X; and
   updating the first CSI report and the second CSI report based on a same CSI calculation.

2. The method of claim 1, further comprising:
   receiving a first CSI report configuration defining reporting of the first CSI report and a second CSI report configuration defining reporting of the second CSI report, wherein the determination that the first CSI report and the second CSI report contain the same CSI information is made based on the first CSI report configuration and the second CSI report configuration.

3. The method of claim 2, wherein the first CSI report configuration and the second CSI report configuration are associated with a same reference signal for CSI measurement and a same report quantity.

4. The method of claim 2, wherein the first CSI report configuration specifies that the first CSI report is to be transmitted to a first TRP, wherein the second CSI report configuration specifies that the second CSI report is to be transmitted to a second TRP.

5. The method of claim 2, wherein the first CSI report configuration specifies that the first CSI report is to be transmitted on a first uplink channel, wherein the second CSI report configuration specifies that the second CSI report is to be transmitted on a second uplink channel.

6. The method of claim 5, wherein the uplink channel is a physical uplink control channel (PUCCH) or a physical uplink share channel (PUSCH).

7. The method of claim 5, further comprising:
   transmitting the first CSI report on the first uplink channel; and
   transmitting the second CSI report on the second uplink channel.

8. An apparatus for wireless communication, the apparatus being a user equipment (UE), comprising:
   a memory; and
   at least one processor coupled to the memory and configured to:
   determine to report channel state information (CSI) reports;
   determine that a first CSI report and a second CSI report to be reported contain same CSI information;
   determine that total processing units required for updating the first CSI report and the second CSI report are processing units required for updating one of the first CSI report and the second CSI report;
   receive a first trigger for reporting the first CSI report;
   receive a second trigger for reporting the second CSI report;
   determine that E processing units are remaining available prior to updating the first CSI report and the second CSI report, E being an integer;
   determine that X processing units are required to update each of the first CSI report and the second CSI report individually, X being an integer;
   determine that R processing units are available after committing to update the first CSI report and the second CSI report, R being equal to E minus X; and
   update the first CSI report and the second CSI report based on a same CSI calculation.

9. The apparatus of claim 8, wherein the at least one processor is further configured to:
   receive a first CSI report configuration defining reporting of the first CSI report and a second CSI report configuration defining reporting of the second CSI report, wherein the determination that the first CSI report and the second CSI report contain the same CSI information is made based on the first CSI report configuration and the second CSI report configuration.

10. The apparatus of claim 9, wherein the first CSI report configuration and the second CSI report configuration are associated with a same reference signal for CSI measurement and a same report quantity.

11. The apparatus of claim 9, wherein the first CSI report configuration specifies that the first CSI report is to be transmitted to a first TRP, wherein the second CSI report configuration specifies that the second CSI report is to be transmitted to a second TRP.

12. The apparatus of claim 9, wherein the first CSI report configuration specifies that the first CSI report is to be transmitted on a first uplink channel, wherein the second CSI report configuration specifies that the second CSI report is to be transmitted on a second uplink channel.

13. The apparatus of claim 12, wherein the uplink channel is a physical uplink control channel (PUCCH) or a physical uplink share channel (PUSCH).

14. The apparatus of claim 12, wherein the at least one processor is further configured to:
   transmit the first CSI report on the first uplink channel; and transmit the second CSI report on the second uplink channel.

15. A non-transitory computer-readable medium storing computer executable code for wireless communication of a user equipment (UE), comprising code to:

determine to report channel state information (CSI) reports;

determine that a first CSI report and a second CSI report to be reported contain same CSI information;

determine that total processing units required for updating the first CSI report and the second CSI report are processing units required for updating one of the first CSI report and the second CSI report;

receive a first trigger for reporting the first CSI report;

receive a second trigger for reporting the second CSI report;

determine that E processing units are remaining available prior to updating the first CSI report and the second CSI report, E being an integer;

determine that X processing units are required to update each of the first CSI report and the second CSI report individually, X being an integer;

determine that R processing units are available after committing to update the first CSI report and the second CSI report, R being equal to E minus X; and update the first CSI report and the second CSI report based on a same CSI calculation.

16. The non-transitory computer-readable medium of claim 15, wherein the code is further configured to:

receive a first CSI report configuration defining reporting of the first CSI report and a second CSI report configuration defining reporting of the second CSI report, wherein the determination that the first CSI report and the second CSI report contain the same CSI information is made based on the first CSI report configuration and the second CSI report configuration.

17. The non-transitory computer-readable medium of claim 16, wherein the first CSI report configuration and the second CSI report configuration are associated with a same reference signal for CSI measurement and a same report quantity.

18. The non-transitory computer-readable medium of claim 16, wherein the first CSI report configuration and the second CSI report configuration both specify a first reference signal as a measurement resource.

* * * * *